(12) United States Patent
Yoshida (10) Patent No.: US 7,791,640 B2
(45) Date of Patent: Sep. 7, 2010

(54) ELECTRONIC CAMERA AND IMAGE GENERATING APPARATUS GENERATING STEREO IMAGE

(75) Inventor: Hideaki Yoshida, Hachioji (JP)

(73) Assignee: Olympus Corporation, Tokyo (JP)

( * ) Notice: Subject to any disclaimer, the term of this patent is extended or adjusted under 35 U.S.C. 154(b) by 992 days.

(21) Appl. No.: 11/039,640

(22) Filed: Jan. 20, 2005

(65) Prior Publication Data

US 2005/0174427 A1 Aug. 11, 2005

(30) Foreign Application Priority Data

Jan. 23, 2004 (JP) ............................. 2004-015668

(51) Int. Cl.
*H04N 5/225* (2006.01)
(52) U.S. Cl. ...................... 348/207.99; 348/46; 348/47; 348/48; 348/49
(58) Field of Classification Search ............ 348/42–60, 348/218.1; 396/324–331; 359/462–477; 353/7–9
See application file for complete search history.

(56) References Cited

U.S. PATENT DOCUMENTS

| | | | | | |
|---|---|---|---|---|---|
| 4,957,351 | A | * | 9/1990 | Shioji | 349/15 |
| 5,223,892 | A | * | 6/1993 | Ikenoue et al. | 355/77 |
| 5,510,831 | A | * | 4/1996 | Mayhew | 348/47 |
| 5,987,222 | A | * | 11/1999 | Terashita | 358/1.9 |
| 6,415,108 | B1 | * | 7/2002 | Kamishima et al. | 396/312 |
| 6,944,328 | B2 | * | 9/2005 | Yoshida | 382/154 |
| 7,019,780 | B1 | * | 3/2006 | Takeuchi et al. | 348/340 |
| 2002/0071616 | A1 | * | 6/2002 | Yoshida | 382/305 |
| 2003/0043292 | A1 | * | 3/2003 | Pyle et al. | 348/364 |
| 2003/0174204 | A1 | * | 9/2003 | Otani et al. | 348/51 |
| 2003/0175024 | A1 | * | 9/2003 | Miyoshi et al. | 396/154 |
| 2004/0004705 | A9 | * | 1/2004 | Saito | 355/78 |
| 2004/0008251 | A1 | * | 1/2004 | Mashitani et al. | 348/51 |
| 2004/0201708 | A1 | * | 10/2004 | Endo et al. | 348/211.1 |
| 2004/0263612 | A1 | * | 12/2004 | Harter et al. | 348/49 |
| 2005/0008220 | A1 | * | 1/2005 | Miyazaki | 382/154 |
| 2008/0049100 | A1 | * | 2/2008 | Lipton et al. | 348/43 |
| 2010/0085423 | A1 | * | 4/2010 | Lange | 348/46 |

FOREIGN PATENT DOCUMENTS

| | | |
|---|---|---|
| JP | 5-7374 | 1/1993 |
| JP | 2002-218506 | 8/2002 |
| JP | 2003-284096 | 10/2003 |

OTHER PUBLICATIONS

Notice of Reasons for Rejection for Japanese Patent Application No. 2005-009376, mailed Mar. 16, 2010 (2 pgs.) with translation (3 pgs.).

* cited by examiner

*Primary Examiner*—John M Villecco
*Assistant Examiner*—Kent Wang
(74) *Attorney, Agent, or Firm*—Straub & Pokotylo; John C. Pokotylo (57) ABSTRACT

According to the present invention, a CCD color image pickup element forms a right and left parallel object images and photoelectrically converts the object images into a object image signal. In this case, the object image signal is analyzed to calculate exposure information on a predetermined photometric area. Then, when an SPM synthesizing section generates a stereo image from the object image signal, a partition area setting section sets the luminance level of a partition are on the basis of the exposure information on the parallel object images, the partition area is a median strip used to arrange monocular images of the parallel object images away from each other.

55 Claims, 4 Drawing Sheets

ELECTRONIC CAMERA AND IMAGE GENERATING APPARATUS GENERATING STEREO IMAGE

CROSS-REFERENCE TO RELATED APPLICATIONS

This application is based upon and claims the benefit of priority from prior Japanese Patent Application No. 2004-015668, filed Jan. 23, 2004, the entire contents of which are incorporated herein by reference.

BACKGROUND OF THE INVENTION

1. Field of the Invention

The present invention relates to an electronic camera and an image generating apparatus which are applied to pickup of stereo images, and more specifically, to an electronic camera and an image generating apparatus which generate a stereo image enabling an appropriate print photograph to be obtained even if a multi-lens stereo image is picked up or generated.

2. Description of the Related Art

Various systems have been proposed which photograph and record an image containing stereoscopic information and which reproduce the image for observation. Among these systems, what is called a binocular stereo system has long been utilized which records two images having a parallax corresponding to the viewpoints of the right and left eyes and which present these images for the respective eyes. This is because this configuration is simplest and inexpensive, and effective.

For what is called the personal use of the binocular stereo, a system using stereo pair images, which is most basic and traditional, is now widely used to enable very clear images to be very inexpensively observed; however, the system is limited in that it allows only one person to observe the image at a time.

For example, Jpn. Pat. Appln. KOKAI Publication No. 2002-218506 discloses a stereo image pickup apparatus using a stereo adapter. In this apparatus, a system controller is provided with a stereo adapter detecting section that detects that a stereo adapter has been attached, an automatic exposure (AE) control section that analyzes an object image signal relating to a photometric area to calculate photometric information required for exposure control, and a photometric area setting section that sets the photometric area. The photometric area setting section has a function for setting different photometric areas for a normal photographing mode and for a stereo photographing mode. Consequently, the optimum photometric areas are set for the normal photographing mode and for the stereo photographing mode.

If the apparatus disclosed in Jpn. Pat. Appln. KOKAI Publication No. 2002-218506 is used to pick up a stereo image, the stereo image to be recorded is expected to undergo appropriate exposure. However, if this image is printed, problems described below may occur notably with prints in print service laboratories that are popular in the market.

If a recording medium on which images are recorded is brought to a general laboratory for printing, recorded images (frames) are generally printed after automatically undergoing various types of image processing suitable for the respective images. A representative example is the correction of exposure. Even with an image subjected to a slight overexposure or underexposure during photographing, an image processing system of a print machine analyzes the level of a signal for the image to correct a luminance level (reflectance or density) during printing. As a result, an image at the appropriate luminance level is obtained.

In the correction of exposure during printing of a normal image, an averaging process is often employed which weights a central part of the image when analyzing the image signal level. That is, compared to the exposure control for a camera, the print machine carries out a signal level analysis corresponding to center emphasis average photometry (which is used to emphasize a main object, while avoiding impairing the entire image). Then, a luminance level (print density) output on the basis of the result of the analysis is corrected to print an appropriate desired image.

When the stereo pair image is printed, a phenomenon described below may occur compared to normal images. The stereo pair image is composed of two monocular images arranged side by side and corresponding to the right and left viewpoints. Accordingly, a central part of an object is located at two lateral positions, and a boundary portion between the monocular images is located in a central part of the entire stereo image. Thus, when the correction of exposure for normal images is applied, the exposure may not be corrected as intended (miscorrection). Specifically, when a stereo adapter is attached in the apparatus, eclipse shading is likely to occur in the boundary portion. Consequently, the luminance level of the boundary portion is prone to be low regardless of the original luminance levels of both monocular images. As a result, it is misunderstood that the main object is dark. Therefore, the exposure correction may result in overexposure in which the luminance level of the original image is abnormally high.

If the target is not a conventional film image but a digital image, the problem with the exposure during printing may result from the structure of a stereo image itself compared to the eclipse shading that may occur when the stereo adapter is attached. The reason will be described below.

For a conventional common stereo pair image, it is difficult to identify the boundary between two lateral monocular images. That is, provided that a display screen is viewed, it is difficult to determine whether the image is two lateral monocular images constituting a stereo image or a normal image having two similar lateral patterns.

With regards only to this, if marked eclipse shading is caused by the stereo adapter, it may actually advantageously serve as a mark for determining that the image is a stereo image. Of course, the eclipse shading caused by the adapter essentially disturbs the image. In addition, the eclipse shading varies depending on the characteristics of the main image pickup optical system, for example, an aperture value. Accordingly, the eclipse shading is not always useful.

Thus, to ensure such capability of visual determinations, it is possible to utilize the fact that digital images can be very easily processed (image processing). Specifically, a right and left monocular images for one stereo image to be generated are arranged away from each other. The area between these images is filled with black (luminance level of 0). Then, the area serves as what is called a median strip for the two images. This enables the stereo image to be visually directly determined. Such an area may be provided so as to surround the images (for example, like glasses frames) rather than being provided between the two images. Of course, in this case, the area provides similar functions.

Thus, a recording format with the above median strip or image frame is suitably employed as one for stereo images. However, in this case, the black median strip is present at a position similar to the one where the eclipse shading may occur when the stereo adapter is installed. This may result in similar miscorrection of exposure.

In the above description, for ease of under-standing, the stereo system is of the binocular type corresponding to the right and left eyes and the print system is the print service laboratory, which is popular in the market. However, of course, the above problems may also occur if an image recorded using a general multi-lens stereo system with three or more lenses is printed using a print apparatus having a function for correcting exposure (automatic luminance level adjustment).

BRIEF SUMMARY OF THE INVENTION

Accordingly, it is a feature of the present invention to provide an electronic camera and an image generating apparatus which generate a stereo image adapted to enable appropriate luminance level (print density) control to be performed even when the image is printed using a print apparatus having an exposure correcting function.

A first characteristic of the present invention is to provide an electronic camera generating a stereo image, the camera comprising:

a stereo image pickup optical system which has a predetermined parallax and which separates an object image into a plurality of parallel object images;

an image pickup section which photoelectrically converts the object images formed by the stereo image pickup optical system, into an object image signal;

a partition area setting section which, for a stereo image generated on the basis of image data on the parallel subject images obtained by the separative formation by the stereo image pickup optical system, sets a partition area inserted in order to arrange monocular images of the parallel object images away from each other; and a signal level control section which controls an image signal level of the partition area set by the partition area setting section.

A second characteristic of the present invention is to provide an image generating apparatus generating a stereo image by arranging a plurality of monocular images under predetermined conditions, the monocular images being recorded so as to have a predetermined parallax, the apparatus comprising:

a partition area setting section which, for the stereo image, sets a partition area inserted in order to arrange the monocular images away from each other; and a signal level control section which controls an image signal level of the partition area set by the partition area setting section.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the drawings.

First Embodiment

Figure 1:
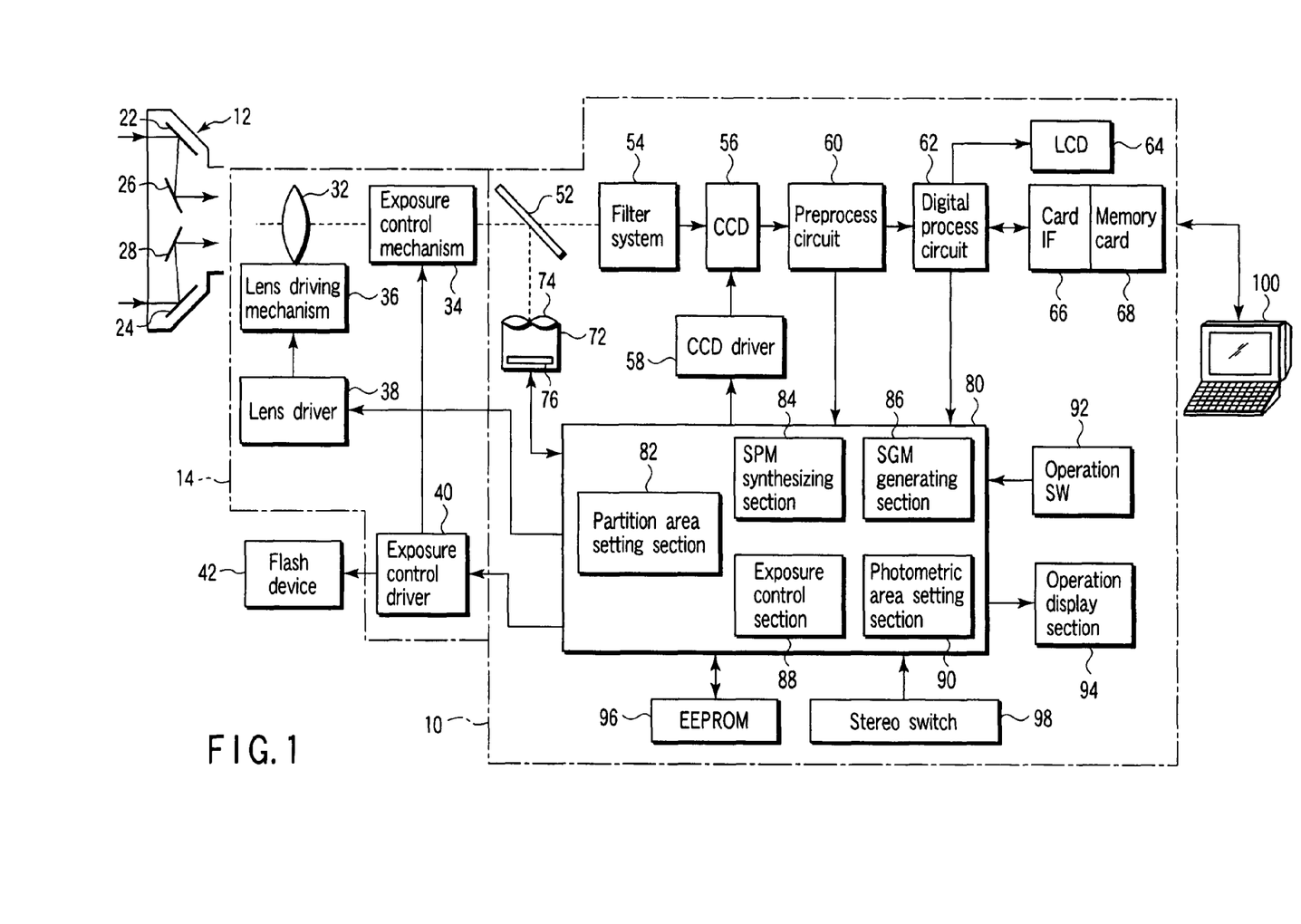
FIG. 1 is a block diagram showing the configuration of an electronic camera according to a first embodiment of the present invention.

FIG. 1 is a block diagram showing the configuration of an electronic camera according to a first embodiment of the present invention.

The electronic camera is composed of a camera main body 10, a lens unit 14 having a lens barrel, and a stereo adapter 12 that is stereo adapter means for photographing stereo images.

In the electronic camera according to the present embodiment, the mirror type stereo adapter 12 can be attached to and removed from the lens unit 14. The stereo adapter 12 has a pair of mirrors 22 and 24 and another pair of mirrors 26 and 28. The mirrors 22 and 24 are arranged in the stereo adapter 12 at positions separated by a distance substantially corresponding to a parallax. Moreover, the mirrors 26 and 28 are arranged at positions such that light reflected by the mirrors 22 and 24 is guided to the camera main body 10.

Light passing through the mirrors 22, 24, 26, and 28 in the stereo adapter 12 is guided to an exposure control mechanism 34 via a group of photographing lenses 32 in the lens unit 14. The light is further guided to a half mirror 52 in the camera main body 10.

The lens unit 14 has the photographing lens group 32, the exposure control mechanism 34, a lens driving mechanism 36, a lens driver 38, and an exposure control driver 40.

Before the stereo adapter 12 is attached, the photographing lens group 32 is a main image pickup optical system (non-stereo optical system) which can carry out normal (monocular) image pickup. Focusing and zooming adjustments are driven by the lens driving mechanism 36. That is, the stereo adapter 12 and the main image pickup optical system constitute a stereo image pickup optical system. The lens driver 38 controls the lens driving mechanism 36. Further, the exposure control mechanism 34 controls the aperture of the photographing lens group 32 and a shutter device (not shown). The exposure control driver 40 controls the exposure control mechanism 34.

The light guided from the lens unit 14 to the camera main body 10 passes through the half mirror 52 and a filter 54 for allowing low frequencies to pass through which cuts infrared light. The light then reaches a charge coupled device (CCD) color image pickup element 56 serving as an image pickup section. The CCD color image pickup element 56 then forms an image. The CCD color image pickup element 56 is image pickup means controlled by a CCD driver 58. The CCD color image pickup element 56 photoelectrically converts an object image into an electric signal. In addition, the CCD color image pickup element 56 is of an interline type having a vertical overflow drain structure and is also of a progressive (sequential) scan type.

The signal resulting from the photoelectric conversion by the CCD color image pickup element 56 is output to a digital process circuit 62 via a preprocess circuit 60 including an A/D converter; the digital process circuit 62 executes a color signal generating process, a matrix converting process, and other various digital processes. The digital process circuit 62 processes the image signal digitalized to generate color image data.

Further, a liquid crystal display (LCD) section 64 is connected to the digital process circuit 62. A memory card 68 such as a CF (Compact Flash Memory Card) or smart medium is also connected to the digital process circuit 62 via a card interface (IF) 66. The LCD section 64 displays color image data. The memory card 68 stores the color image data.

The memory card 70 can be attached in an external personal computer 100. Accordingly, an image recorded on the memory card 68 can be, for example, displayed and processed on the personal computer 100. Moreover, a printer (not shown) can be used to print the image.

The half mirror 52 is configured to reflect a part of an incident object image. The light reflected is guided to an AF sensor module 72. The AF sensor module 72 detects a focus on the basis of a light beam incident through the photographing lens group 32. The AF sensor module 72 has a separator lens 74 for dividing a pupil and an AF sensor 76 composed of a line sensor.

A system controller (CPU) 80 integrally controls each section of the camera main body 10 and lens unit 14. The system controller 80 connects not only to the lens driver 38, exposure control driver 40, CCD driver 58, preprocess circuit 60, digital process circuit 62, and AF sensor module 72 but also to an operation switch section 92, an operation display section 94, a nonvolatile memory (EEPROM) 96, and a stereo switch (SW) 98.

The operation switch section 92 is composed of various switches such as a release switch and a photographing mode setting switch. The operation display section 94 displays, for example, the operational state and mode status of the camera.

The EEPROM 96 is a memory that stores various pieces of setting information. A stereo switch 98 is used to switch the mode when the stereo adapter 12 is attached in the lens unit 14. In this case, the photographing mode is switched by operating the stereo switch 98. However, the present invention is not limited to this. For example, the photographing mode may be automatically switched by providing a detecting function in the stereo adapter 12.

The system controller 80 cooperates with the exposure control mechanism 34 in controlling the driving of the CCD color image pickup element 56 by the CCD driver 58 to read exposure (charge accumulation) and a signal. The system controller 80 loads the signal read into the digital process circuit 62 via the preprocess circuit 36. The digital process circuit 62 executes various types of signal processing on the signal. Then, the signal processed is recorded on the memory card 68 via the card interface 66.

A flash device 42 serves as light emitting means to emit a flash. The system controller 80 controls the flash device 42 via the exposure control driver 40 in the lens unit 14.

The system controller 80 further has a partition area setting section 82 that is partition area setting means, a stereo pair image (SPM: Stereo Pair in Multimedia) synthesizing section 84, a section 86 that synthesizes an electronic image file SGM (Stereo Gram in Multimedia) in a predetermined format, an exposure control section 88 that is photometric and exposure control means, and a photometric area setting section 90 that is photometric area setting means. For the SPM and SGM, see Jpn. Pat. Appln. KOKAI Publication No. 2002-77942, which is the applicant's preceding application.

The partition area setting section 82 sets specific data (image pattern) on a boundary portion between monocular images constituting a stereo image picked up, in other words, an area serving as a median strip (this area will hereinafter referred to as a partition area). In terms of functions, the partition area setting section 82 is a part of the SPM synthesizing section 84, described below. However, since the partition area setting section 82 plays a key role in the present invention, it is specifically separately illustrated.

Further, the SPM synthesizing section 84 synthesizes monocular images to obtain an SPM image. However, the SPM synthesizing section 84 also acts as signal level control means for controlling the image signal level of a partition area set by the partition area setting means 82. Moreover, the SGM generating section 86 is provided to generate SGM image data from an SPM image.

The exposure control section 88 is control means for analyzing an object image signal relating to a photometric area to calculate exposure information required for exposure control or to calculate luminance information on a plurality of monocular images. The exposure control section 88 also acts as an exposure (luminance) level detecting section. Further, the photometric area setting section 90 sets the photometric area previously described.

The photometric area setting means 90 has a function for setting different photometric areas for a normal photographing mode and for a stereo photographing mode. The photometric area setting means 90 thus sets the optimum photometric areas for the normal photographing mode and for the stereo photographing mode. In this case, in the normal mode, average photometry is applied to the entire photographing range (photographing image frame) on the image pickup element. In the stereo photographing mode, average photometry is applied to the entirety of each of a right and left image frames (image frames for the respective monocular images) provided on the image pickup element. Therefore, in each photographing mode, appropriate exposure control is executed on the entire object. Of course, in this case, any of various well-known photometric systems (for example, center emphasis average photometry in which a central part is weighted and partial photometry for an appropriate area such as a concentric rectangle having a length and a width equal to 70% of those of the image frame (the area of the concentric rectangle is 50% of the image frame)) may be applied to each image frame.

Figure 2:
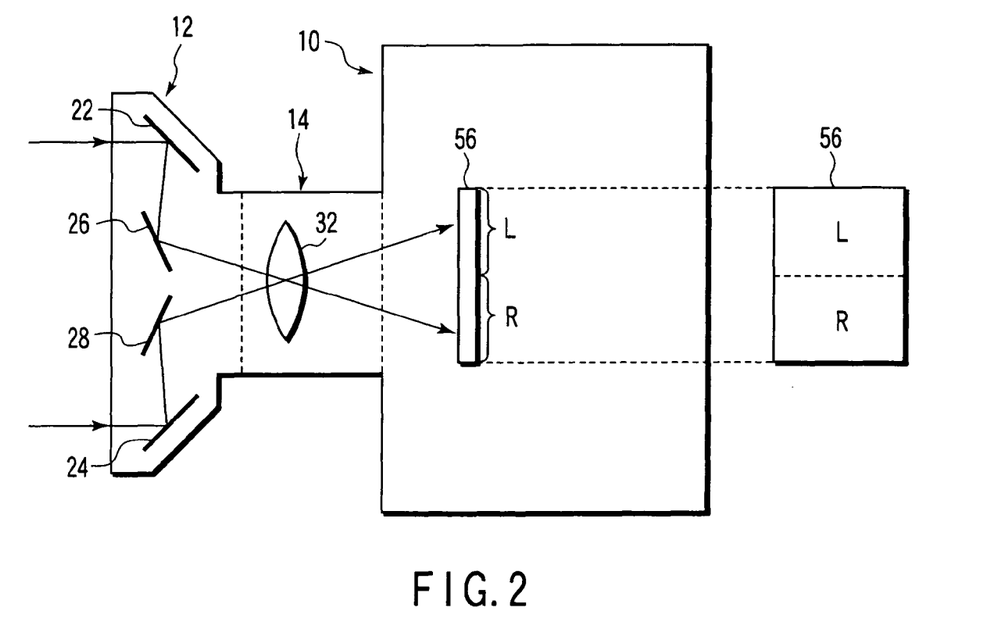
FIG. 2 is a diagram showing the configuration of a mirror type stereo adapter to be attached in the electronic camera according to the present embodiment.

FIG. 2 is a diagram showing the configuration of the mirror type stereo adapter to be attached in the electronic camera according to the present embodiment.

In FIG. 2, the mirror type stereo adapter 12 can be attached to and removed from the lens unit 14, having a lens barrel installed in the camera main body 10. The mirrors 22 and 24 are arranged in the stereo adapter 12 at positions separated by a distance substantially corresponding to a parallax. Moreover, the mirrors 26 and 28 are arranged at positions such that light reflected by the mirrors 22 and 24 is guided to the camera main body 10.

Light incident on the left eye mirror 24 of the stereo adapter 12 is formed into an image in an area L of the image pickup element 56 via the mirror 28 and the photographing lens group 32. Likewise, light incident on the right eye mirror 22 is formed into an image in an area R of the image pickup element 56 via the mirror 26 and the photographing lens group 32.

In fact, for the object images formed in the areas L and R, eclipse shading may occur in the boundary portion as previously described, or image formed positions may deviate from the correct ones. Thus, to avoid the eclipse shading or correct the positional deviation, two lateral image frames are set so as to trim a predetermined part of each area. Image signals within the two lateral image frames read from the image pickup element 34 constitute two monocular images to be recorded.

Then, as previously described, during photographing (exposure), exposure control is performed so that the two monocular images are appropriately exposed. Moreover, one stereo image (SPM) is generated in which these two images are arranged at predetermined positions. Finally, the images are recorded on the memory card 68 as a digital image file (SGM) in a predetermined format in which after a compressing process is executed as required, attached (meta) data is added to the images. This process is similar to that described in the patent documents previously cited. Accordingly, its detailed description is omitted. However, it is the main point of the present invention that data on the partition area (image pattern) is set in generating an SPM. This will thus be described below in detail.

Figure 3:
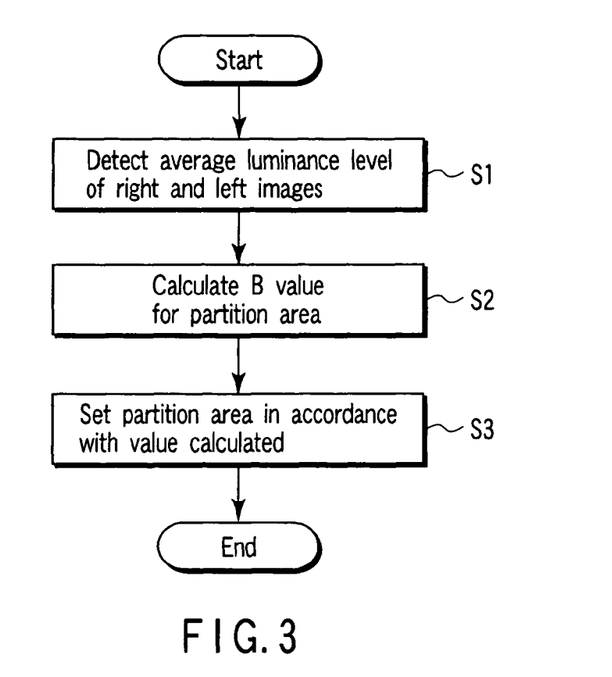
FIG. 3 is a flowchart illustrating an operation of setting a partition area which operation is performed by the electronic camera according to the first embodiment of the present invention.

Now, with reference to the flow chart in FIG. 3, description will be given of an operation of setting data on the partition area which operation is performed by the electronic camera according to the first embodiment of the present invention. This operation is controlled by the system controller 80.

The setting of data on the partition area is required only for stereo photographing. Accordingly, naturally, the setting is not made when the mode switch 98, provided on the camera main body 10, is set in the normal mode, that is, it is not set for normal photographing.

Then, in step S1, for the entire two lateral monocular images, the average luminance signal level of the image is calculated as an average exposure level.

For a supplementary description, since a control target value for an exposure control system is the luminance signal level of the image, the "exposure level" is equivalent to the "luminance signal level". In other words, the exposure level controlled by the exposure control section 88 corresponds to the luminance signal level of the image finally recorded. In particular, with a system that analyzes the luminance signal level of a picked-up video signal as in the case of the electronic camera according to the present embodiment, the above correspondence is direct. Therefore, taking into account a gamma characteristic (nonlinear processing) often provided to images, the present invention can be applied in exactly the same manner to a general stereo image generating apparatus which does not have an image pickup function and which generates one SPM from two (in general, a plurality of) recorded monocular images corresponding to, for example, two lateral view points.

Further, if for example, a photo diode sensor dedicated for photometry is used in addition to the CCD 56, which is an image pickup element, the exposure level can be calculated on the basis of information from the photometry-dedicated sensor depending on the equivalent relationship previously described; the luminance signal level of the video signal need not necessarily be analyzed.

In this case, the average luminance signal level is calculated as described below, using a picked-up image signal. R, G, and B values (signal levels) for each pixel are defined as R, G, B with the notation of coordinates omitted. The average luminance level is defined as L.

$$L = 1/N \cdot \Sigma Y$$

Wherein, $Y = C_1 R + C_2 G + C_3 B$

In these equations, $\Sigma$ denotes a sum for a target pixel area, N denotes the number of pixels in the area, and $C_1$ to $C_3$ denote matrix coefficients. For example, with an NTSC system, $C_1 = 0.3$, $C_2 = 0.59$, and $C_3 = 0.11$.

The simplest way for avoiding the miscorrection of exposure during printing which results from the partition area is to fill the partition area with a luminance signal level equal to the average luminance signal level determined, that is, a uniform pattern with a luminance L. In the present embodiment, a solid blue ((R, G, B)) = (0, 0, B)), a color having a high chroma, is used in order to improve the capability of visual determinations.

Thus, in step S2, the value for B, which fills the partition area, is calculated. On the basis of a luminance matrix coefficient, $B = L/C_3$. That is, for all the pixels in the partition area, $(R, G, B) = (0, 0, L/C_3)$. As a result, the partition area is filled only with the blue component, which has a high chroma.

In step S3, a partition area is generated in accordance with the value for B calculated as previously described.

Figure 4:
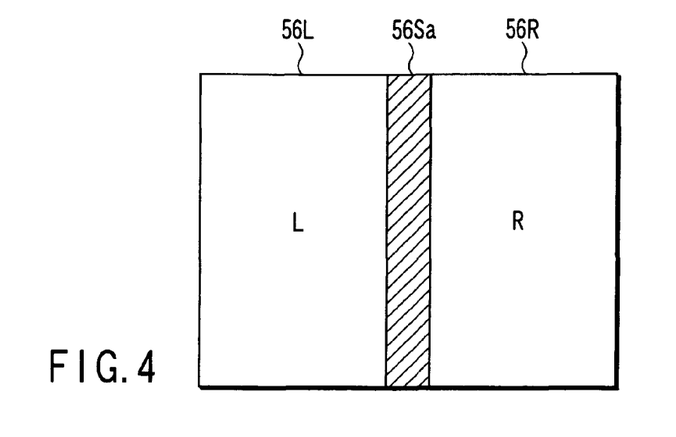
FIG. 4 is a diagram showing an example of a right and left images and a partition area created in accordance with the partition area setting operation shown in FIG. 3.

FIG. 4 is a diagram showing an example of SPM created as described above and consisting of right and left monocular images and a partition area. In FIG. 4, a partition area 56Sa that is shaded in the figure is formed between a left image 56L and a right image 56R. In the first embodiment, the partition area 56Sa is filled only with the B (blue) component and does not contain the R (red) or G (green) component.

A pattern with such a color component is determined to be clearly different from normal objects. Consequently, the mere sight of the image shown in FIG. 4 makes it possible to easily determine that the image is not a normal (monocular) one in which similar objects are arranged side by side but a stereo one containing the partition area 56Sa. Since the luminance level of the partition area is controlled as previously described, it is possible to prevent the miscorrection of exposure during printing.

In the above description of the embodiment, the partition area 56Sa is filled only with the B (blue) components, a uniform pattern. However, the present invention is not limited to this. Of course, the partition area 56Sa may be filled only with the R (red) or G (green) component. Alternatively, the partition area 56Sa may be composed of an arbitrary solid color other than the R, G, and B components (for example, neutral gray). Alternatively, instead of the entire partition area, most of the interior of the partition area may be filled with a solid color with a high chroma.

Moreover, in the first embodiment, the partition area is generated using the average exposure level (average luminance level) detected by the exposure control section 88 serving as an exposure level detecting section. However, the present invention is not limited to this. The partition area may be generated by, for example, detecting the exposure level (luminance level) of a central part of each monocular image frame. Alternatively, since the monocular images in the stereo image have very similar patterns, it is possible to detect the exposure level (luminance level) of one representative image instead of all the images.

Second Embodiment

In the description of the first embodiment, the partition area is formed only of the same color component. However, it is also possible to form a partition area using a pattern clearly different from the object. Accordingly, in the second embodiment, description will be given of an example in which the partition area is formed of a repeated pattern of two color stripes. In this case, the two colors are white (bright part) and black (dark part). In particular, (255, 255, 255) and (0, 0, 0) are used as a saturation level (maximum and minimum values), that is, an RGB value.

According to the second embodiment, the configuration of an electronic camera is basically similar to that shown in FIG. 1. Accordingly, the same parts are denoted by the same reference numerals and their illustration and description are omitted.

Figure 5:
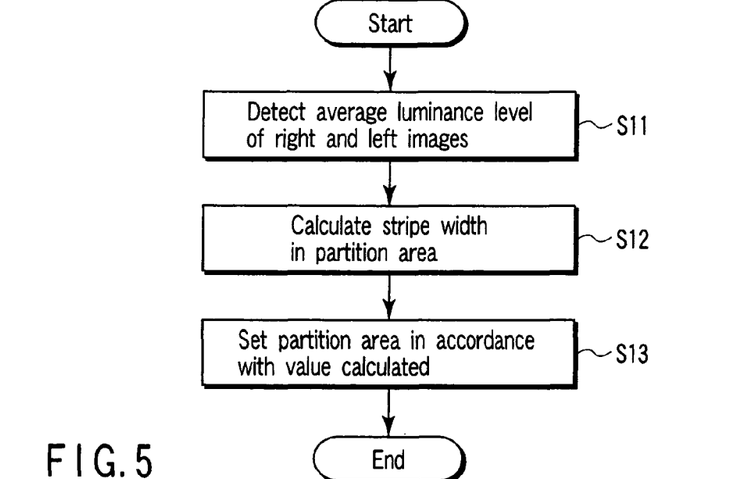
FIG. 5 is a flowchart illustrating an operation of setting a partition area which operation is performed by an electronic camera according to a second embodiment of the present invention.

FIG. 5 is a flowchart illustrating an operation of setting a partition area which operation is performed by the electronic camera according to the second embodiment of the present invention to carry out stereo photographing. This operation is controlled by the system controller 80.

First, in step S11, the average luminance level L of the right and left images is calculated as in the case of the first embodiment.

Figure 6:
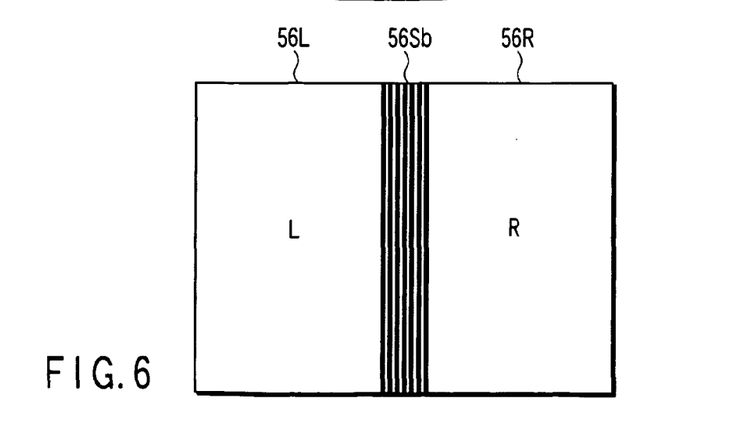
FIG. 6 is a diagram showing an example of a right and left images and a partition area created in accordance with the partition area setting operation shown in FIG. 5.

Subsequently, in step S12, stripes in the partition area are calculated. Specifically, if a partition area 56Sb such as the one shown in FIG. 6 is formed, a black and white stripe pattern is formed in which a black stripe is placed outside and in contact with each monocular image. Then, in this case, the black stripes have an equal width, while the white stripes have an equal width. On the other hand, provided that the widths of each black stripe and each white stripe can be arbitrarily set, the sum of the widths in the black stripe pattern is defined as WB. The sum of the widths in the white stripe pattern is defined as WW. The width of the partition area 56Sb is defined as WP. Then, WB and WW are calculated as described below.

The average luminance level of the partition area is determined as follows:

$$255 \times WW/(WB+WW) = 255 \times WW/WP$$

Then, this is made equal to the average luminance level L, determined in step S11.

$$255 \times WW/WP = L$$

Therefore, the following equations are given.

$$WW = WP \times L/255$$

$$WB = WP \times (255-L)/255$$

For six white stripes and seven black stripes such as those shown in FIG. 6, the width of each stripe is WW/6 or WB/7.

Then, in step S13, the partition area 56Sb thus calculated is actually generated as an image.

The partition area 56Sb is determined to be clearly different from normal objects. Accordingly, it is possible to easily determine that the image shown in FIG. 6 is not a normal (monocular) one in which similar objects are arranged side by side but a stereo one containing the partition area 56Sb. Since the luminance level of the partition area is controlled as previously described, it is possible to prevent the miscorrection of exposure during printing.

In the second embodiment, in the partition area 56Sb, the outer stripes are dark, whereas the inner stripes are bright. The present invention is not limited to this. Of course, the stripes may be arranged in the opposite positions.

Third Embodiment

Figure 7:
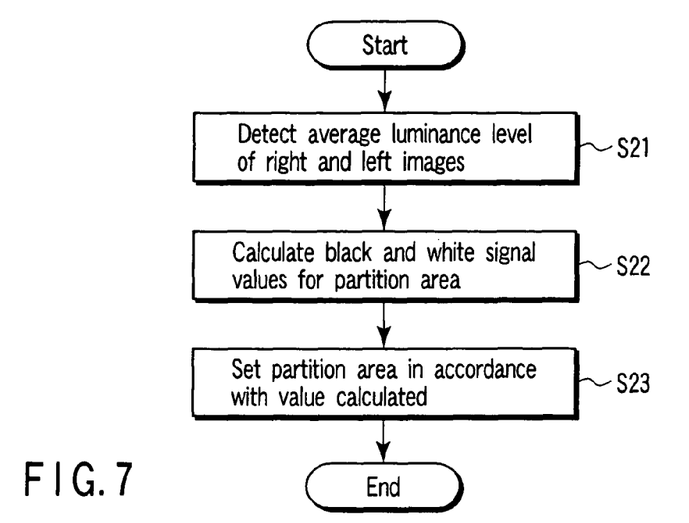
FIG. 7 is a flowchart illustrating an operation of setting a partition area which operation is performed by an electronic camera according to a third embodiment of the present invention.

FIG. 7 is a flowchart illustrating an operation of setting a partition area which operation is performed by an electronic camera according to a third embodiment of the present invention. This operation is controlled by the system controller 80.

In contrast to the partition area composed of the repeated stripe pattern according to the second embodiment, a partition area according to the third embodiment is composed of a checker pattern.

The construction of the partition area according to the third embodiment is similar to that shown in steps S11 to S13 in the flowchart in FIG. 5 according to the second embodiment except for step S22.

Compared to the stripe, the checker pattern maintains a black and white area ratio of 50% (except for the edges of the pattern) even with a change in the intervals between the patterns (corresponding to the widths of the stripes). Accordingly, in this case, the average luminance level of the entire pattern is made equal to the average luminance level L, determined in step S21, by carrying out level adjustments instead of using a black and white saturation level.

Therefore, in step S22, a signal level (RGB value) is calculated which is assigned to each of the black and white pixels of a predetermined checker pattern. Specific arithmetic expressions will be shown below.

For example, for L<128:

white (2L, 2L, 2L) black (0, 0, 0).

For L>127:

white (255, 255, 255) black (2L-255, 2L-255, 2L-255)

Figure 8:
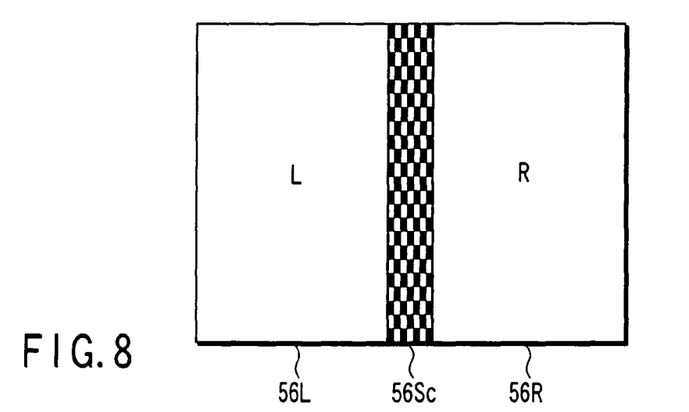
FIG. 8 is a diagram showing an example of a right and left images and a partition area created in accordance with the partition area setting operation shown in FIG. 7.

FIG. 8 is a diagram showing an example of right and left images and a partition area created as described above. In FIG. 8, a partition area 56Sc with a checker pattern in black and white is formed between a left image 56L and a right image 56R. Then, the partition area 56Sc is determined to be clearly different from normal objects. Accordingly, it is possible to easily determine that the image shown in FIG. 8 is not a normal (monocular) one in which similar objects are arranged side by side but a stereo one containing the partition area 56Sc. Since the luminance level of the partition area is controlled as previously described, it is possible to prevent the miscorrection of exposure during printing.

Fourth Embodiment

Figure 9:
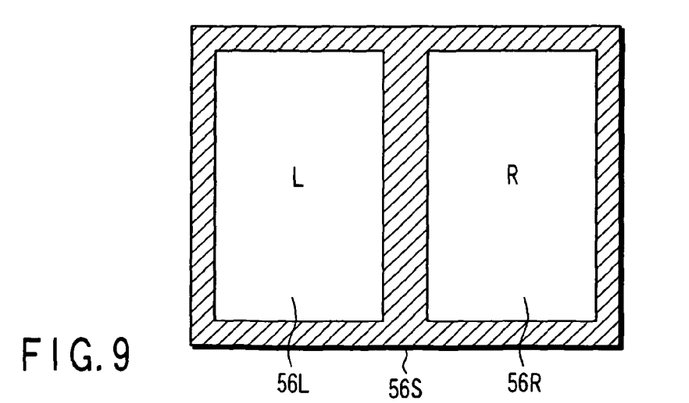
FIG. 9 is a diagram showing an example of a right and left images and a partition area created in accordance with a partition area setting operation performed by an electronic camera according to a fourth embodiment of the present invention.

In the description of the first to third embodiments, the partition area is placed halfway between the right and left images. However, the present invention is not limited to this. The partition area is provided in order to distinguish a stereo image from a normal image. Accordingly, for example, a partition area 56S may be formed so as to surround the left image 56L and the right image 56R (so as to appear generally like glasses frames) as shown in FIG. 9. Moreover, only a part of the partition area 56S may be provided as a partition area.

Naturally, in this case, the partition area may have any pattern such as a single color, repeated stripes, or a checker pattern which can be relatively distinguished from the object image.

In the description of the above embodiments, for simplification, 8 bits are used to express a digital value, and linear characteristics are implicitly assumed without referring to γ corrections. However, to more strictly set the average luminance level of the partition area, it is desirable to assume, for the partition area, a γ characteristic equal to the γ characteristic of the main image (two monocular images). Then, if the calculation of the average luminance level is affected by gamma, de-γ corrections are made to obtain a linear characteristic before calculation.

Further, the above embodiments relate to the electronic camera, that is, an image pickup recording apparatus. The present invention is not limited to this. An embodiment of another aspect of the present invention is, for example, a stereo image generating apparatus which takes the form of an image editing apparatus having a slot in and from which a memory medium can be installed and removed, the image editing apparatus being alternatively configured so that images are input to and output by the apparatus via a network connection. The stereo image generating apparatus has a function for generating one SPM (SGM) from two recorded monocular images corresponding to two lateral viewpoints and picked up by a separate image pickup device. All of the first to fourth embodiments can be applied to the above embodiment of the stereo image generating apparatus as they are except for parts relating to image pickup.

Furthermore, in the above description, the stereo system is of a binocular type corresponding to the right and left eyes. However, the present invention is of course applicable to common multi-lens stereo systems that use three or more lenses.

According to the present invention, a stereo image can be generated which is adapted to enable an appropriate luminance level (print density) control to be performed even when the image is printed using a print apparatus using an exposure correcting function.

Further, the present invention is not limited to the above embodiments. Of course, many variations may be made to the present invention without departing from its sprit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera generating a stereo image, the camera comprising:

a stereo image pickup optical system which has a predetermined parallax and which separates an object image into a plurality of parallel object images;

an image pickup section which photoelectrically converts the object images formed by the stereo image pickup optical system, into an object image signal;

a partition area setting section which, for a stereo image generated on the basis of image data on the parallel subject images obtained by the separative formation by the stereo image pickup optical system and to be recorded in a single file, sets a predetermined partition area inserted in order to arrange monocular images of the parallel object images away from each other, wherein the image pattern of said predetermined partition area is generated independently of the pattern of said monocular images of the parallel object images; and a signal level control section for a stereo photographing mode, which controls an image signal level of said independently generated image pattern of said predetermined partition area set so that it becomes a value calculated using at least some information from the parallel object images.

2. The electronic camera according to claim 1, wherein the signal level control section performs control such that an average signal level of the image pattern of the partition area is almost equal to an average exposure level of the parallel object images.

3. The electronic camera according to claim 2, wherein the partition area setting section sets a uniform pattern for the partition area.

4. The electronic camera according to claim 2, wherein the partition area setting section sets a solid color with a high chroma for most of at least an interior of the partition area.

5. The electronic camera according to claim 2, wherein the partition area setting means sets the partition area so that the partition area has a nonuniform pattern and contains bright parts and dark parts.

6. The electronic camera according to claim 5, wherein the partition area setting section sets the partition area so that a part of the partition area which is in contact with each monocular image of the parallel object images is the dark part.

7. The electronic camera according to claim 5, wherein the partition area setting section sets the partition area so that a part of the partition area which is in contact with each monocular image of the parallel object images is the dark part.

8. The electronic camera according to claim 5, wherein the partition area setting section sets the partition area so that the partition area has a plurality of stripes that are a repeated pattern of the bright and dark parts.

9. The electronic camera according to claim 5, wherein the partition area setting section sets the partition area so that most of at least the interior of the partition area has a checker pattern in which the bright part alternates with the dark part in both vertical and horizontal directions.

10. The electronic camera according to claim 1, wherein the signal level control section performs control such that the average signal level of the image pattern of the partition area is almost equal to an exposure level of a central part of each monocular image of the parallel object images.

11. The electronic camera according to claim 10, wherein the partition area setting section sets a uniform pattern for the partition area.

12. The electronic camera according to claim 10, wherein the partition area setting section sets a solid color with a high chroma for most of at least an interior of the partition area.

13. The electronic camera according to claim 10, wherein the partition area setting means sets the partition area so that the partition area has a nonuniform pattern and contains bright parts and dark parts.

14. The electronic camera according to claim 13, wherein the partition area setting section sets the partition area so that a part of the partition area which is in contact with each monocular image of the parallel object images is the bright part.

15. The electronic camera according to claim 13, wherein the partition area setting section sets the partition area so that a part of the partition area which is in contact with each monocular image of the parallel object images is the dark part.

16. The electronic camera according to claim 13, wherein the partition area setting section sets the partition area so that the partition area has a plurality of stripes that are a repeated pattern of the bright and dark parts.

17. The electronic camera according to claim 13, wherein the partition area setting section sets the partition area so that most of at least the interior of the partition area has a checker pattern in which the bright part alternates with the dark part in both vertical and horizontal directions.

18. The electronic camera according to claim 1, wherein the partition area setting section sets a uniform pattern for the partition area.

19. The electronic camera according to claim 1, wherein the partition area setting section sets a solid color with a high chroma for most of at least an interior of the partition area.

20. The electronic camera according to claim 1, wherein the partition area setting means sets the, partition area so that the partition area has a nonuniform pattern and contains bright parts and dark parts.

21. The electronic camera according to claim 20, wherein the partition area setting section sets the partition area so that a part of the partition area which is in contact with each monocular image of the parallel object images is the bright part.

22. The electronic camera according to claim 20, wherein the partition area setting section sets the partition area so that a part of the partition area which is in contact with each monocular image of the parallel object images is the dark part.

23. The electronic camera according to claim 20, wherein the partition area setting section sets the partition area so that the partition area has a plurality of stripes that are a repeated pattern of the bright and dark parts.

24. The electronic camera according to claim 20, wherein the partition area setting section sets the partition area so that most of at least the interior of the partition area has a checker pattern in which the bright part alternates with the dark part in both vertical and horizontal directions.

25. The electronic camera according to claim 1, wherein the partition area setting section sets the partition area as a partial area of a stereo frame pattern configured so as to surround the entire parallel object images, the part continuously constituting the stereo frame pattern.

26. The electronic camera according to claim 1, wherein the number of the plurality of parallel object images formed by the stereo image pickup optical system is two and corresponds to the right and left eyes.

27. The electronic camera according to claim 1, wherein the stereo image pickup optical system is a monocular optical system on which a releasable stereo adapter is attached.

28. The electronic camera according to claim 1, further comprising exposure level detecting section which calculates exposure information on a predetermined photometric area relating to image pickup of the object image,
wherein the signal level control section controls the image signal level of the partition area on the basis of the exposure information detected by the exposure level detecting section.

29. An image generating apparatus generating a stereo image by arranging a plurality of monocular images under predetermined conditions, the monocular images being recorded so as to have a predetermined parallax, the apparatus comprising:

a partition area setting section which, for the stereo image to be recorded in a single file, sets a predetermined partition area inserted in order to arrange the monocular images away from each other, wherein the image pattern of said predetermined partition area is generated independently of the pattern of said monocular images; and a signal level control section for a stereo photographing mode, which controls an image signal level of said independently generated image pattern of said predetermined partition area set so that it becomes a value calculated using at least some information from the plurality of monocular images.

30. The image generating apparatus according to claim 29, wherein the signal level control section performs control such that an average signal level of the image pattern of the partition area is almost equal to an average exposure level of the plurality of monocular images.

31. The image generating apparatus according to claim 30, wherein the partition area setting section sets a uniform pattern for the partition area.

32. The image generating apparatus according to claim 30, wherein the partition area setting section sets a solid color with a high chroma for most of at least an interior of the partition area.

33. The image generating apparatus according to claim 30, wherein the partition area setting means sets the partition area so that the partition area has a nonuniform pattern and contains bright parts and dark parts.

34. The image generating apparatus according to claim 33, wherein the partition area setting section sets the partition area so that a part of the partition area which is in contact with each image of the plurality of monocular images is the bright part.

35. The image generating apparatus according to claim 33, wherein the partition area setting section sets the partition area so that a part of the partition area which is in contact with each image of the plurality of monocular images is the dark part.

36. The image generating apparatus according to claim 33, wherein the partition area setting section sets the partition area so that the partition area has a plurality of stripes that are a repeated pattern of the bright and dark parts.

37. The image generating apparatus according to claim 33, wherein the partition area setting section sets the partition area so that most of at least the interior of the partition area has a checker pattern in which the bright part alternates with the dark part in both vertical and horizontal directions.

38. The image generating apparatus according to claim 29, wherein the signal level control section performs control such that the average signal level of the image pattern of the partition area is almost equal to an exposure level of a central part of each image of the plurality of monocular images.

39. The image generating apparatus according to claim 38, wherein the partition area setting section sets a uniform pattern for the partition area.

40. The image generating apparatus according to claim 38, wherein the partition area setting section sets a solid color with a high chroma for most of at least an interior of the partition area.

41. The image generating apparatus according to claim 38, wherein the partition area setting means sets the partition area so that the partition area has a nonuniform pattern and contains bright parts and dark parts.

42. The image generating apparatus according to claim 41, wherein the partition area setting section sets the partition area so that a part of the partition area which is in contact with each image of the plurality of monocular images is the bright part.

43. The image generating apparatus according to claim 41, wherein the partition area setting section sets the partition area so that a part of the partition area which is in contact with each image of the plurality of monocular images is the dark part.

44. The image generating apparatus according to claim 41, wherein the partition area setting section sets the partition area so that the partition area has a plurality of stripes that are a repeated pattern of the bright and dark parts.

45. The image generating apparatus according to claim 41, wherein the partition area setting section sets the partition area so that most of at least the interior of the partition area has a checker pattern in which the bright part alternates with the dark part in both vertical and horizontal directions.

46. The image generating apparatus according to claim 29, wherein the partition area setting section sets a uniform pattern for the partition area.

47. The image generating apparatus according to claim 29, wherein the partition area setting section sets a solid color with a high chroma for most of at least an interior of the partition area.

48. The image generating apparatus according to claim 29, wherein the partition area setting means sets the partition area so that the partition area has a nonuniform pattern and contains bright parts and dark parts.

49. The image generating apparatus according to claim 48, wherein the partition area setting section sets the partition area so that a part of the partition area which is in contact with each image of the plurality of monocular images is the bright part.

50. The image generating apparatus according to claim 48, wherein the partition area setting section sets the partition area so that a part of the partition area which is in contact with each image of the plurality of monocular images is the dark part.

51. The image generating apparatus according to claim 48, wherein the partition area setting section sets the partition area so that the partition area has a plurality of stripes that are a repeated pattern of the bright and dark parts.

52. The image generating apparatus according to claim 48, wherein the partition area setting section sets the partition area so that most of at least the interior of the partition area has a checker pattern in which the bright part alternates with the dark part in both vertical and horizontal directions.

53. The image generating apparatus according to claim 29, wherein the partition area setting section sets the partition area as a partial area of a stereo frame pattern configured so as to surround the entire plurality of monocular images, the part continuously constituting the stereo frame pattern.

54. The image generating apparatus according to claim 29, wherein the number of the plurality of monocular images is two and corresponds to the right and left eyes.

55. The image generating apparatus according to claim 29, further comprising luminance level detecting section which calculates luminance information on the plurality of monocular images,
    wherein the signal level control section controls the image signal level of the partition area on the basis of the luminous information detected by the luminance level detecting section.

\* \* \* \* \*